(No Model.) 5 Sheets—Sheet 1.

G. A. STANBERY.
MACHINE FOR PRESSING TILE, BRICK, &c.

No. 453,133. Patented May 26, 1891.

(No Model.) 5 Sheets—Sheet 4.
G. A. STANBERY.
MACHINE FOR PRESSING TILE, BRICK, &c.

No. 453,133. Patented May 26, 1891.

WITNESSES
F. L. Durand
H. M. Sterling

INVENTOR
George A. Stanbery
by L. W. Sinsabaugh
Attorney (No Model.) 5 Sheets—Sheet 5.
G. A. STANBERY.
MACHINE FOR PRESSING TILE, BRICK, &c.
No. 453,133. Patented May 26, 1891.
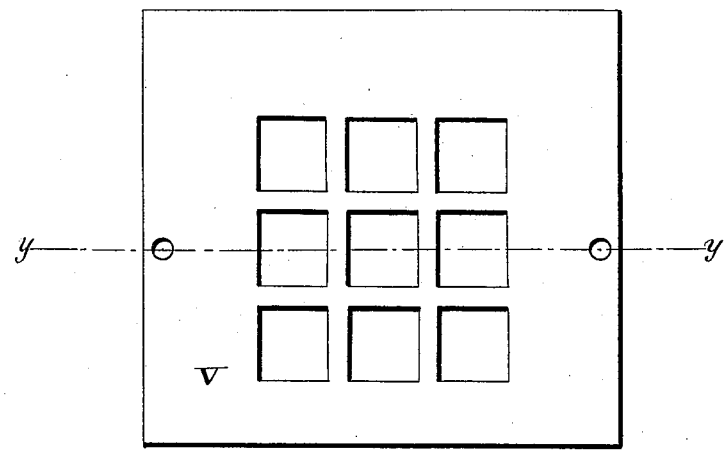
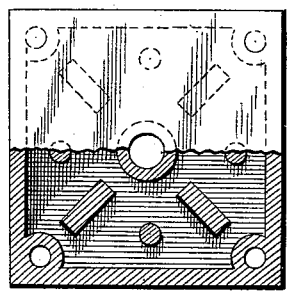
WITNESSES
Franck L. Ourand
H. M. Styling
INVENTOR
George A. Stanbery
by [signature]
Attorney

UNITED STATES PATENT OFFICE.

GEORGE A. STANBERY, OF ZANESVILLE, OHIO.

MACHINE FOR PRESSING TILE, BRICK, &c.

SPECIFICATION forming part of Letters Patent No. 453,133, dated May 26, 1891.

Application filed January 24, 1891. Serial No. 378,963. (No model.)

*To all whom it may concern:*

Be it known that I, GEORGE A. STANBERY, a citizen of the United States, residing at Zanesville, in the county of Muskingum and State of Ohio, have invented new and useful Improvements in Machines for Pressing Tile, Bricks, and other Clay Substances into Form; and I do hereby declare the following to be a full, clear, and exact description of said invention, reference being had to the accompanying drawings, and to the letters of reference marked thereon, which form a part of this specification.

My invention relates to improvements in machines for pressing clay and other substances into form, and is more especially designed for the manufacture of encaustic tiles.

This invention is designed as an improvement on the machine shown, described, and claimed in Letters Patent No. 388,926, granted to me September 4, 1888; and it consists in having the lower dies or plungers rigidly fixed, but removably attached, to a suitable support or standard, while the upper plunger or die is movable toward and from the lower plungers or dies.

My invention consists, further, in having the molds movable in a vertical direction so they will yield to the downward pressure of the upper plunger or platen while the same is exerting the pressure necessary to form the article.

My invention consists, further, in so mounting the molds that they will have a still further movement downward after the requisite pressure has been exerted by the upper plunger, so as to eject the articles from the mold, as will more fully appear.

Other novel features will be described hereinafter, and pointed out in the claims.

Figure 1:
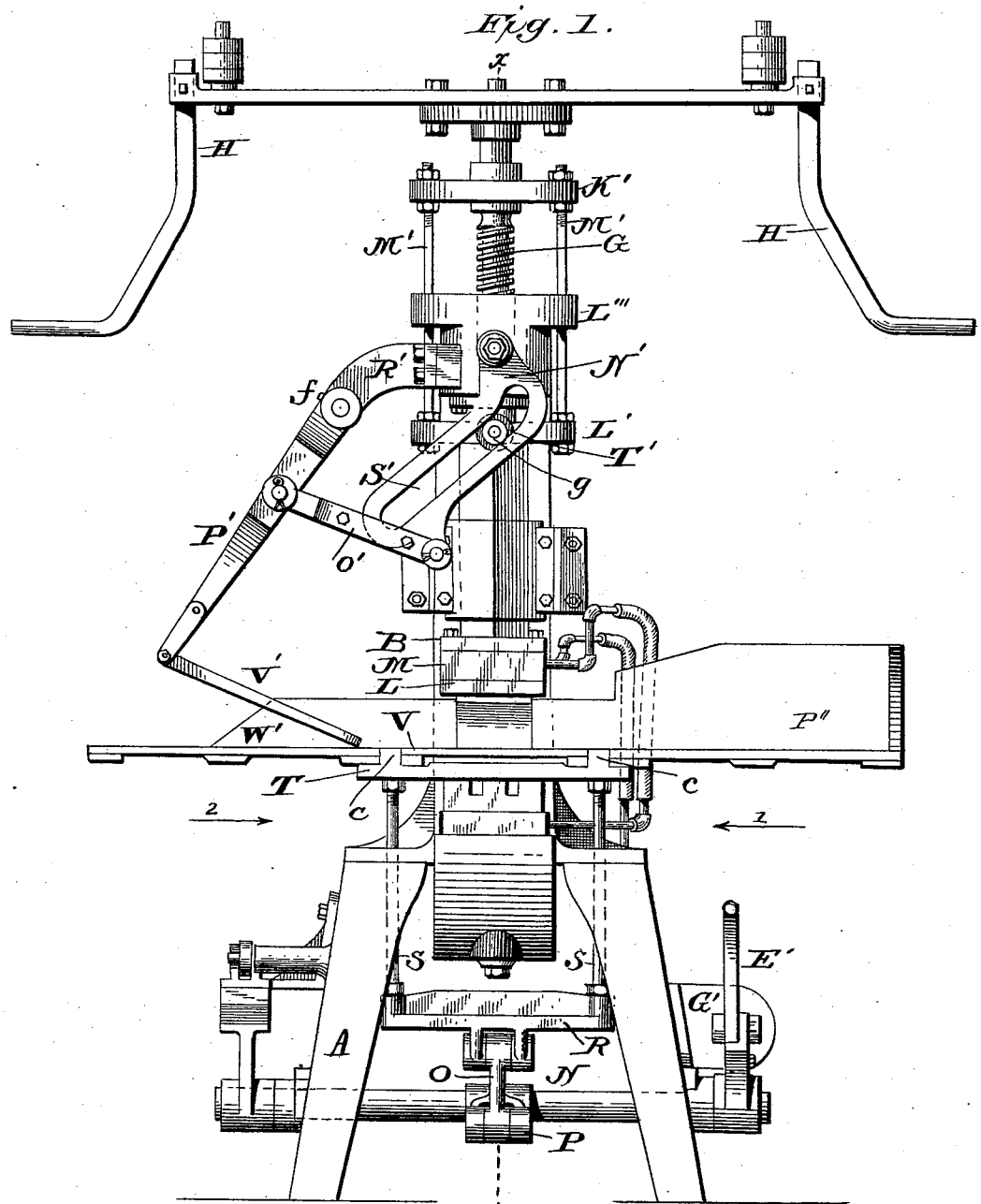
Figure 2:
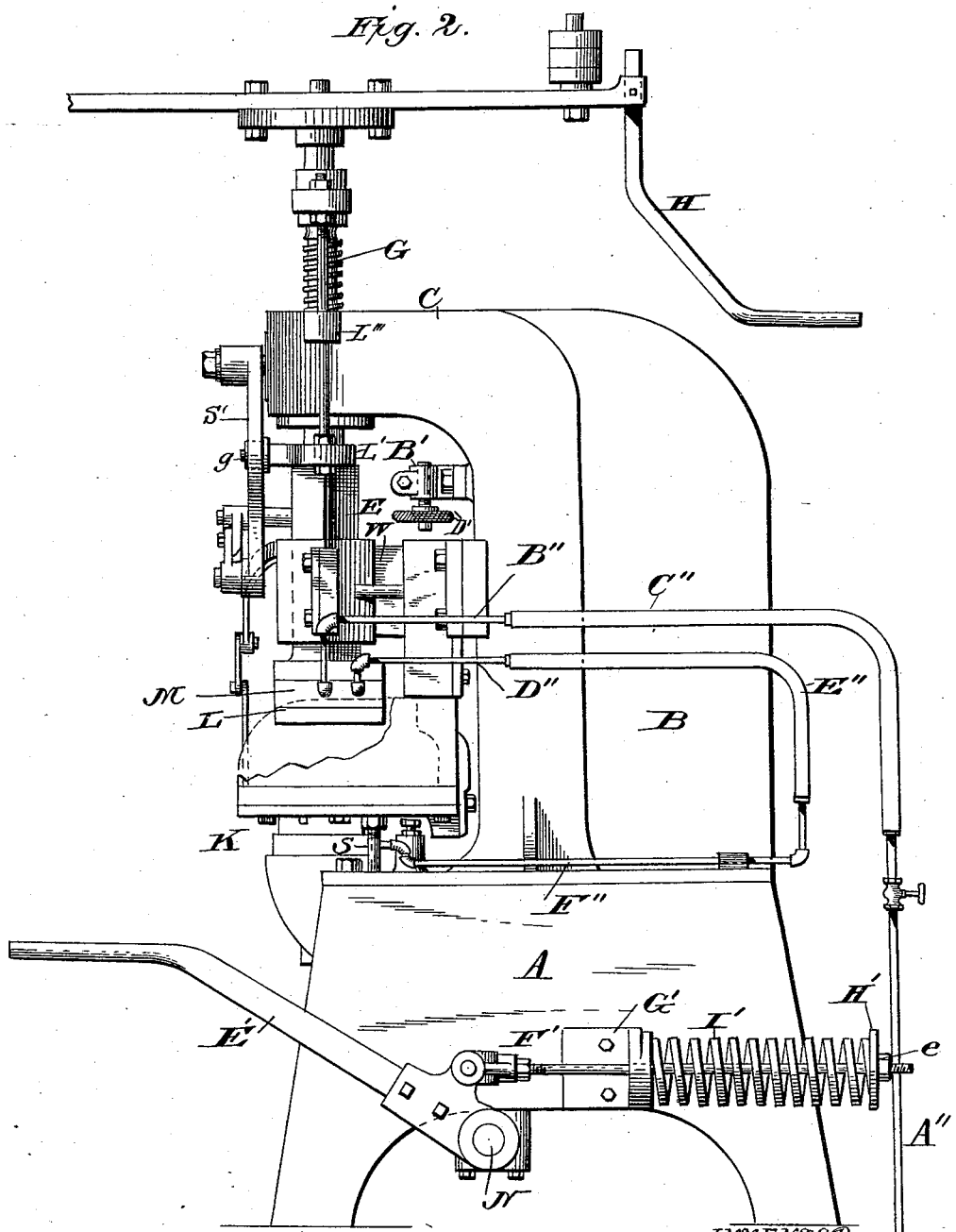
Figure 3:
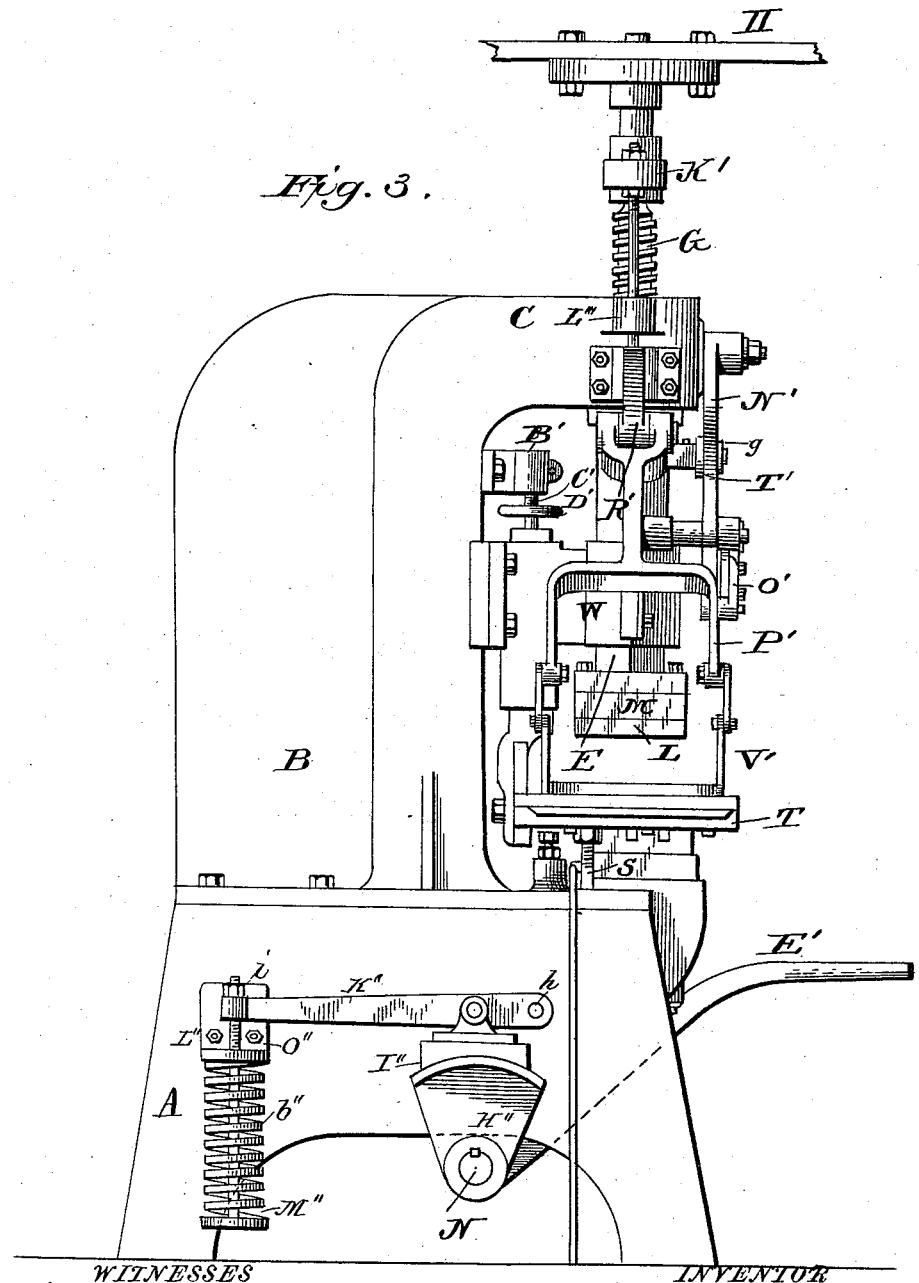
Figure 4:
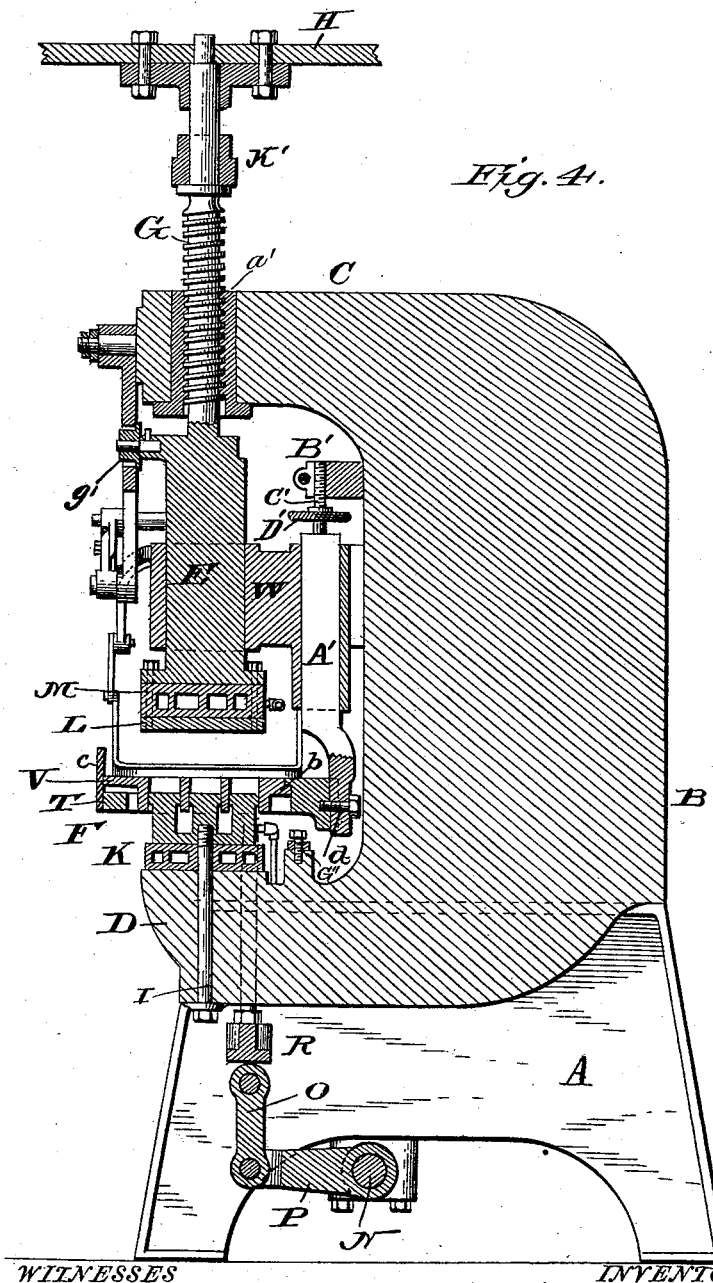

Referring to the drawings, Figure 1 is a front view of the machine in elevation, showing the movable compression-plunger in an elevated position. Fig. 2 is a side view in elevation looking in the direction of arrow 1 in Fig. 1. Fig. 3 is also a side view in elevation looking in the direction of arrow 2 in Fig. 1. Fig. 4 is a vertical sectional view taken on the line $x\ x$ of Fig. 1. Fig. 5 is a top or plan view of the mold. Fig. 6 is a sectional view of the mold, taken on the line $y\ y$ of Fig. 5. Fig. 7 is a top or plan view of the lower dies or plungers. Fig. 8 is a sectional view of the lower dies or plungers, taken on the line $x'\ x'$ of Fig. 7. Fig. 9 is a top or plan view of one of the steam-chambers, partly in section.

A indicates the base of the machine, and B the upper portion or frame-work of the machine, in which the upper plunger and other portions of the operating device are mounted. The upper portion or frame B may be cast with the base A or otherwise firmly secured thereto, so as to form a rigid structure for the operating parts. The front portion of the frame B is cast so as to form the projecting portions C and D, the portion C forming the support for the upper plunger E, while the portion D forms the support for the lower die or plunger F. The upper plunger E is operated by a screw-shaft G, which works in a suitable screw-threaded bearing $a'$ in the projecting portion C of the frame B, said screw-shaft G being operated by the hand-lever H, in the usual manner of screw-presses. The lower die or plunger F is secured to the portion D by means of the bolt I, and is so arranged that the dies can be interchangeable, so that dies or plungers of different styles or patterns can be secured to the portion D to suit the requirements of the case.

Between the dies or plungers F and on top of the portion D is placed a hollow metallic steam-chamber K, which communicates with suitable steam-pipes for keeping said chamber hot, as will more fully hereinafter appear. It will be noticed, however, in this connection that the lower dies or plungers F are fixed and firmly and rigidly supported by the extension D of the frame B.

L is the upper die removably secured to the plunger E. Between the die L and plunger E is placed the steam-box M. The ingress and egress of the steam to said box will be more fully hereinafter described.

N is a shaft mounted in suitable supports in the frame or base A, to which is connected in its central portion a link or toggle-lever O by means of the lever or arm P. To the upper end of the link or toggle-lever O is connected the cross-head R, as shown in Fig. 1. At each end of the cross-head R are secured the upright standards or bars S, to the upper ends of which is secured the frame or cross-head T, in which is mounted the mold or molds V, said molds being removable from the frame or cross-head T, so that any desired number or form of mold may be inserted or used to correspond with the desired form of the tile or article. One side or edge of the mold v fits under a shoulder or ledge b, formed in the table or cross-head T, while the other side rests against the lugs or projections c, which are secured to or made part of the table or cross-head T. It will be noticed that by this construction the molds can be readily removed and others of different configuration put into the table or cross-head.

W is a bracket or arm cast integral with or otherwise secured to the frame B, through which bracket or arm the plunger E is designed to work up and down in the usual manner. In the rear portion of the bracket or arm W is an opening through which the rod or bar A' passes, the lower end of said bar being secured to the frame F, as shown at d in Fig. 4.

B' is a bracket secured to the frame or portion B, in which is mounted a set-screw C', said set-screw being provided with a hand-wheel D', by means of which the set-screw is raised and lowered, so as to limit the upward movement of the bar A' and table or cross-head T. It will be noticed that by this construction and arrangement I am enabled to regulate the depths of the molds and the amount of clay to be deposited in the same.

E' is a lever secured to one end of the shaft N, and F' is a rod secured to a projection on or near the inner end of the lever E', said rod being passed through a bracket or guide G', secured to the base of the machine, and on the outer end of the rod F' is secured a disk H', which is held in position by means of the nut e on the outer screw-threaded end of the rod F'.

Between the bracket G' and the disk H' is placed a coiled spring I', which serves to hold the lever E' in an elevated position, which in turn will raise the arm P, the link O, and the cross-head R with the cross-head or table T, and thus hold the molds V in an elevated position while the same are being filled with the proper charge of clay, and all of which goes to form a yielding support of said molds and mold-frame, and in this connection it will be understood that the charge of clay in the molds is regulated by the raising and lowering of the table or cross-head T through the medium of the bar A' and the set-screw C'.

To the upper portion of the screw-shaft G is secured a cross-head K' by means of the rods M', which is connected to similar cross-heads L'. The rods M' operate in the lugs L''', formed on each side of the projecting portions C'.

To the upper and outer end of the projecting portion C of the frame is pivoted the upper end of the swinging lever N', the lower end of said lever being connected to the rod or bar O', which in turn is connected to the off-carrying frame P'. The upper end of said off-carrying frame P' is pivoted to the outer end of the bracket R', which is secured to or made part of the projecting portion C', as shown at f, so that the off-carrying frame P' is moved back and forth by the devices which will now be described. The lever N' is provided with a slot S', which engages with a stud T', mounted on the cross-head L', said stud T' being provided with the usual friction-wheel g to allow the parts to work freely. To the lower end of the frame P' is provided the yoke or link V', the front end of which rests on the table when the plunger or matrix is raised. It will be observed that as the upper plunger is lowered the stud T', working in the slot S', brings the lever N' and off-carrying frame P' into a vertical or nearly vertical position, and that the front end of the yoke V' is brought over to the other or right-hand side of the molds, so that when the upper plunger is raised the yoke or link V' will be drawn across the table, and the tiles or newly-formed articles will be drawn over onto the table, from whence they are removed by the operators.

A'' is a steam-pipe leading from any suitable source of supply and is connected to the pipe B'', which enters the steam-chamber M of the upper plunger by means of the rubber or flexible pipe C'', so as to allow said plunger to work freely. A similar pipe D'' is connected to the steam-chamber M, the outer end of which is connected to the flexible pipe E'', which in turn is connected to one end of the pipe F'', the other end of pipe F'' being connected to the steam-chamber K of the lower die. It will be noticed that the live steam entering through the pipe A'' enters the steam-chamber M, which heats the same to the proper temperature. The waste steam from the chamber M, together with the water of condensation, is carried through the pipes D'', E'', and F'' to the steam-chamber K of the lower plunger or die.

G'' is the set-screw secured to the frame B, which is designed to limit the throw of the table T, which, in addition to the bar A', tends to regulate the movement of the table T and the molds V.

On the other end of the shaft N from that to which the lever E' is attached is secured an arm H'', the upper end of which is convex, to receive the brake-shoe I'', which is attached to the lever K'', said lever being pivoted to the base A at h, as shown in Fig. 3. To the end opposite the pivot h of the lever K'' is secured the rod L'', which rod passes through an eye in the end of the lever. The rod L'' is screw-threaded at its upper end to receive a screw-nut i, while the lower end of said rod is secured to a disk M'', on which is supported the spiral spring N''. The upper end of the rod L'' passes through a bracket O'', secured to the base A, so that by turning the nut i down the brake-shoe I'' is made to impinge more firmly on the arm H'', and thus hold the table T, with molds V, in an elevated position and allow the same to yield when the upper plunger is brought down on the molds.

The operation of my device is as follows: The upper plunger being in an elevated position, and the molds V, together with the table, being also in an elevated position, the clay is fed or pushed over by the hand of the operator from the clay-receptacle P'' to fill the mold-cavities, after which the hand-levers H are swung around to operate the screw G to force down the plunger L onto the table T and molds V. This vertical movement of the upper plunger is repeated several times until the air is expelled from the clay, and the same is compressed into the desired thickness and density. It will be noticed that in this operation the molds V, together with the table T, have been forced down to accommodate the pressure of the upper plunger, which has covered the entire surface of the molds, and that when such molds and mold-frame are forced down the spiral spring I' is tightened by means of the cross-head R', forcing the link O and crank-arm P connected to it down, the stationary plungers F acting as anvils to resist the pressure of the upper plunger on the clay while the molds yield to the action of the upper plunger, and the clay or articles to be formed is compressed to the desired form and density. After the desired pressure has been exerted on the clay or other body in the mold, the lever E' is depressed, which draws down the table and molds over the lower plunger, thus leaving the articles on a level with the top of the plunger F, and from which they are removed by the link or loop V', as has already been described. After the articles have been removed by the devices just described, the lever E' is raised and the molds and table are drawn up into an elevated position ready for another charge of clay or other material which is desired to be pressed.

What I claim, and desire to secure by Letters Patent, is—

1. In a press of the character described, a stationary plunger or plungers and a movable mold or molds for receiving said plunger or plungers, and a movable plunger adapted to cover but not enter said mold and push the same over the stationary plunger or plungers, as set forth.

2. In a machine for pressing substances into form, a rising and falling mold supported in a suitable frame capable of a similar movement, a stationary plunger adapted to enter the mold cavity or cavities, and a movable plunger or platen adapted to push the mold and its frame over the stationary plunger or plungers, as set forth.

3. In a tile or brick machine of the character described, movable and removable molds mounted on or in a movable frame, said frame being sustained by a yielding or movable support and operated by a separate lever to eject the article, as set forth.

4. In a machine for pressing tile, brick, and other substances into form, a vertically-movable table having a removable mold or molds sustained by a yielding support to allow the compression-plunger to exert a pressure sufficient to press the articles into form, and a supplemental lever for giving the table and molds a further downward movement to eject the article from the mold, as set forth.

In testimony whereof I affix my signature in presence of two subscribing witnesses.

GEORGE A. STANBERY.

Witnesses:
A. W. JENKINS,
ED. F. GRIGSBY.